United States Patent [19]
Averill et al.

[11] Patent Number: 6,033,566
[45] Date of Patent: Mar. 7, 2000

[54] CONTINUOUS FLOW FILTER SYSTEM

[75] Inventors: James B. Averill; Kyle L. Booth; Scotty R. Poe, all of Oklahoma City; Kenneth R. Hudson, Norman, all of Okla.

[73] Assignee: JTJ Systems, Inc., Oklahoma City, Okla.

[21] Appl. No.: 08/943,163

[22] Filed: Oct. 3, 1997

Related U.S. Application Data

[63] Continuation-in-part of application No. 08/678,901, Jul. 12, 1996, abandoned.

[51] Int. Cl.[7] .................................................. B01D 24/00
[52] U.S. Cl. ........................ 210/341; 210/340; 210/435; 210/330; 210/456; 210/333.01; 210/791; 210/777; 210/416.1; 210/97
[58] Field of Search ..................... 210/677, 435, 210/330, 332, 333.01, 333.1, 335, 341, 340, 777, 791, 652, 456, 416.1, 97

[56] References Cited

U.S. PATENT DOCUMENTS

| | | | |
|---|---|---|---|
| 3,679,052 | 7/1972 | Asper | 210/777 |
| 3,907,681 | 9/1975 | Corrigan et al. | 210/108 |
| 4,414,113 | 11/1983 | Laterra | 210/777 |
| 4,560,483 | 12/1985 | Warning et al. | 210/777 |
| 4,592,901 | 6/1986 | Smith et al. | 210/777 |
| 5,062,968 | 11/1991 | Warning | 210/771 |
| 5,223,150 | 6/1993 | Bundy et al. | 210/765 |
| 5,290,454 | 3/1994 | Dorica et al. | 210/710 |

*Primary Examiner*—Ana Fortuna
*Attorney, Agent, or Firm*—Dunlap, Codding, & Rogers, P.C.

[57] ABSTRACT

A filter system for continuously removing solid matter from a wastewater is provided. The flow of wastewater is automatically alternated between a pair of filter chambers, each of which contain a filter assembly, upon the filter assemblies reaching a predetermined spent condition. As the wastewater is being introduced into one of the filter chambers, the filter assembly in the other filter chamber is automatically backwashed and readied for another filtering cycle. Each filter assembly includes a filter element coated with a diatomaceous earth filter media through which the wastewater is drawn by creating a vacuum downstream of the filter assembly.

11 Claims, 3 Drawing Sheets

CONTINUOUS FLOW FILTER SYSTEM

CROSS-REFERENCE TO RELATED APPLICATIONS

This application is a continuation-in-part of U.S. Ser. No. 08/678,901, filed Jul. 12, 1996, entitled WATER TREATMENT SYSTEM.

STATEMENT REGARDING FEDERALLY SPONSORED RESEARCH OR DEVELOPMENT

Not applicable.

BACKGROUND OF THE INVENTION

1. Field of the Invention

The present invention relates generally to filtering devices, and more particularly, but not by way of limitation, to a continuous flow filter system for removing solid matter from a wastewater.

2. Brief Description of the Related Art

Federal, state, and local regulations limit the amount of hydrocarbons, suspended solids, and certain dissolved contaminants that may be discharged into a sewer. Also, processed water that is reused, e.g., industrial processed water, must be cleaned up before reuse. Consequently, industrial plants can either clean up contaminated water for re-use, or clean up the contaminated water prior to discharge or pay substantial disposal costs for the removal and subsequent treatment of the contaminated water. Because liability for spills of contaminated water removed for treatment or disposal remains on the producer of such water, it is desirable to treat the contaminated water on-sight for reuse or discharge.

Numerous systems and apparatuses have previously been proposed to remove contaminants from contaminated water so that the water can be safely discharged or recycled for further use. Many systems employ a wide variety of filtration devices, such as wire and cloth covered pressure filter leaves, tubular elements, ceramic and fine membrane micro- and ultrafiltration, sand anthracite, carbon, diatomaceous earth, walnut shell, and multi-media. These filtration systems are often supplemented with gravity separation and air flotation.

While prior art filtration systems have met with success in the treatment of contaminated water to permit the treated water to be recycled or discharged in compliance with various federal, state, and local regulations, inefficiencies are encountered in the filtration process due to the fact that the solid matter collected on the filters must be removed from the filters on a regular basis. The removal of the solids is typically accomplished by a built-in sluicing header, mechanical vibration, air or steam pressure, or by manual hosing or scraping. The problem with having to clean the filters is that the filtering process is interrupted as the filters are being cleaned, thereby decreasing the efficiency of the filtering process and increasing costs. An additional problem experienced with the cleaning process is that it can be difficult to remove the solids in that the prior art filter systems utilize pressure to force the contaminated liquid through the filter elements. The use of pressure can compress the solids into the filter media thereby making it difficult to remove.

To this end, a need exists for a filter system which is capable of remaining on-line during the cleaning process, which utilizes vacuum pressure to draw the liquid through the filter elements to facilitate the cleaning process, and which is cost effective and satisfies basic compliance with environmental laws and thereby maximizes profitability by the reuse of the treated waters. It is to such a filter system that the present invention is directed.

BRIEF SUMMARY OF THE INVENTION

The present invention is directed to a filter system for continuously removing solid matter from a wastewater. Broadly, the filter system includes a pair of filter chambers, each having an inlet port and an outlet port. A filter assembly is operably positioned in each of the filter chambers between the inlet port and the outlet port. The wastewater is introduced into one of the filter chambers and drawn through the filter assembly to separate solid matter from the wastewater so as to produce an effluent. Upon the filter assembly reaching a predetermined spent condition, the wastewater is diverted to the other filter chamber and drawn through the filter assembly to separate solid matter from the wastewater so as to produce an effluent. As the wastewater is being introduced into one filter chamber and drawn through the respective filter assembly, the spent filter assembly is automatically backwashed and coated with a diatomaceous earth filter media so as be to readied for another filtering cycle.

The objects, features and advantages of the present invention will become apparent from the following detailed description when read in conjunction with the accompanying drawings and appended claims.

DETAILED DESCRIPTION OF THE INVENTION

Figure 1:
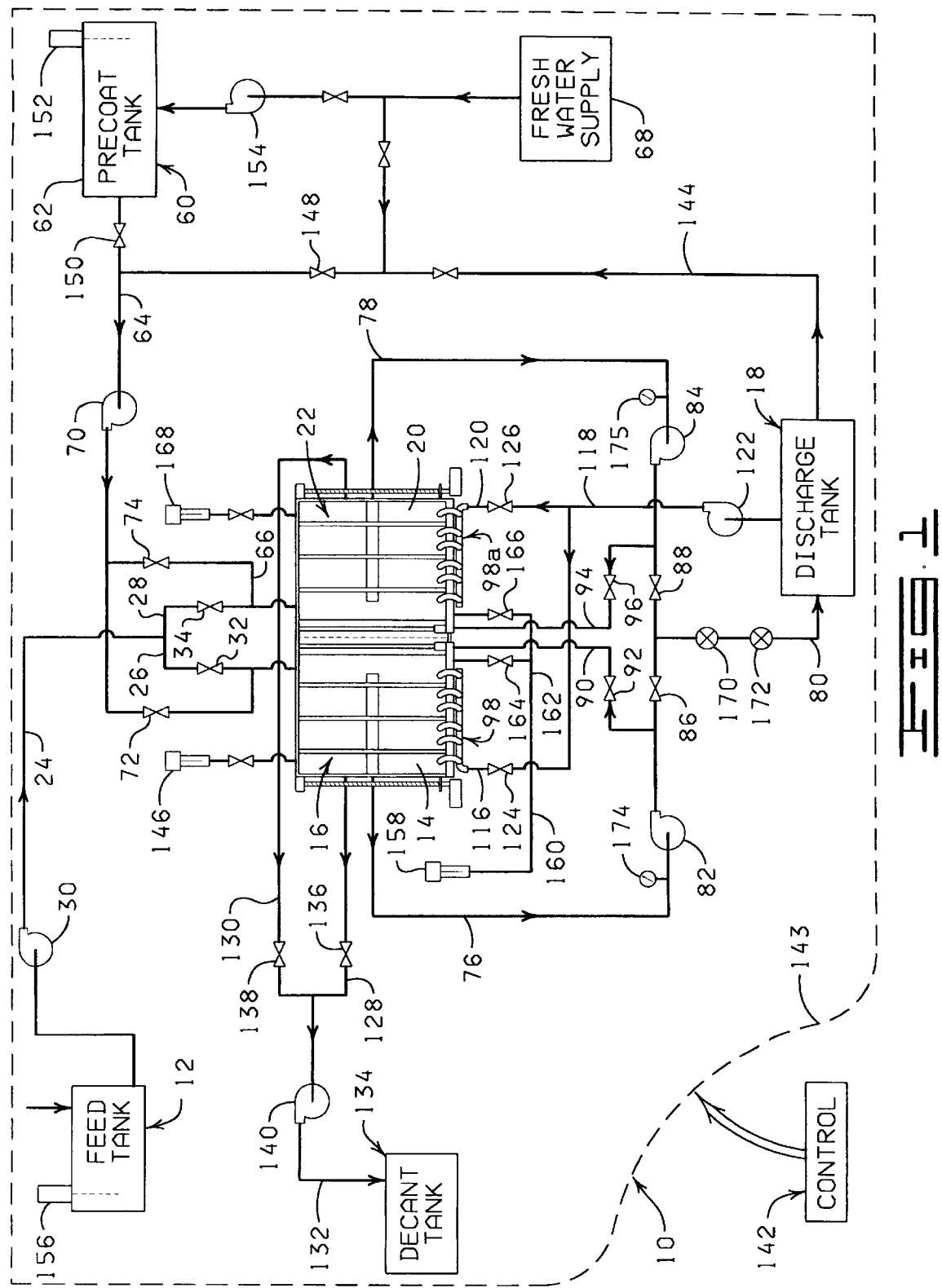
FIG. 1 is a partially schematic, partially diagrammatic view of a continuous flow filter system constructed in accordance with the present invention.

Referring now to the drawings and more particularly to FIG. 1, a filter system 10 for continuously removing solid matter from wastewater in accordance with the present invention is schematically illustrated. In general, wastewater is passed from a source of wastewater, such as a feed tank 12, into a first filter chamber 14. A first filter assembly 16 adapted to remove solid matter as fluid is passed therethrough is positioned in the filter chamber 14. Wastewater is drawn through the filter assembly 16 of the filter chamber 14, withdrawn from the filter chamber 14, and passed to a discharge tank 18 for subsequent disposal or reuse. Upon the filter assembly 16 becoming spent, the wastewater is introduced into a second filter chamber 20 having a second filter assembly 22 adapted to remove solid matter as fluid is passed through the second filter chamber 20. The wastewater is drawn through the second filter assembly 22, withdrawn from the second filter chamber 20, and passed to the discharge tank 18 for subsequent disposal or reuse in a manner substantially identical to that of the first filter chamber 14. As the wastewater is introduced into the second filter chamber 20, the first filter assembly 16 is backwashed and readied for another filtering cycle. Similarly, the second filter assembly 22 is backwashed and readied for another filtering cycle as the wastewater is being introduced into the first filter chamber 14.

As mentioned above, prior art filtration systems are successful in the treatment of contaminated water to permit the treated water to be recycled or discharged in compliance with various federal, state, and local regulations. However, inefficiencies are encountered in the filtration process due to the fact that the filter cake formed on the filter elements must be removed from the filter elements on a regular basis. This is generally accomplished by backwashing the filter elements.

To this point, when the filter elements are required to be cleaned, the filtering process is terminated thereby resulting in decreased efficiency and increased costs. Therefore, one of the primary advantages of the filtering system 10 of the present invention is that the opportunity is provided to clean and ready a spent filter assembly for another filtering cycle while the wastewater is being drawn through another filter assembly so that the filtering process continues substantially uninterrupted.

Describing the filter system 10 in greater detail, wastewater is passed into the feed tank 12 where the wastewater may be stored until a sufficient amount of wastewater is present for filtering. During the filtering process, the wastewater is passed from the feed tank 12 into the first filter chamber 14 via a conduit 24 and a conduit 26 and into the second filter chamber 20 via the conduit 24 and a conduit 28. Conduit 24 is provided with a feed pump 30 for introducing the wastewater into the first and second filter chambers 14 and 20, and the conduits 26 and 28 are provided with control valves 32 and 34, respectively, for controlling the flow of wastewater into the first and second filter chambers 14 and 20.

Figure 2:
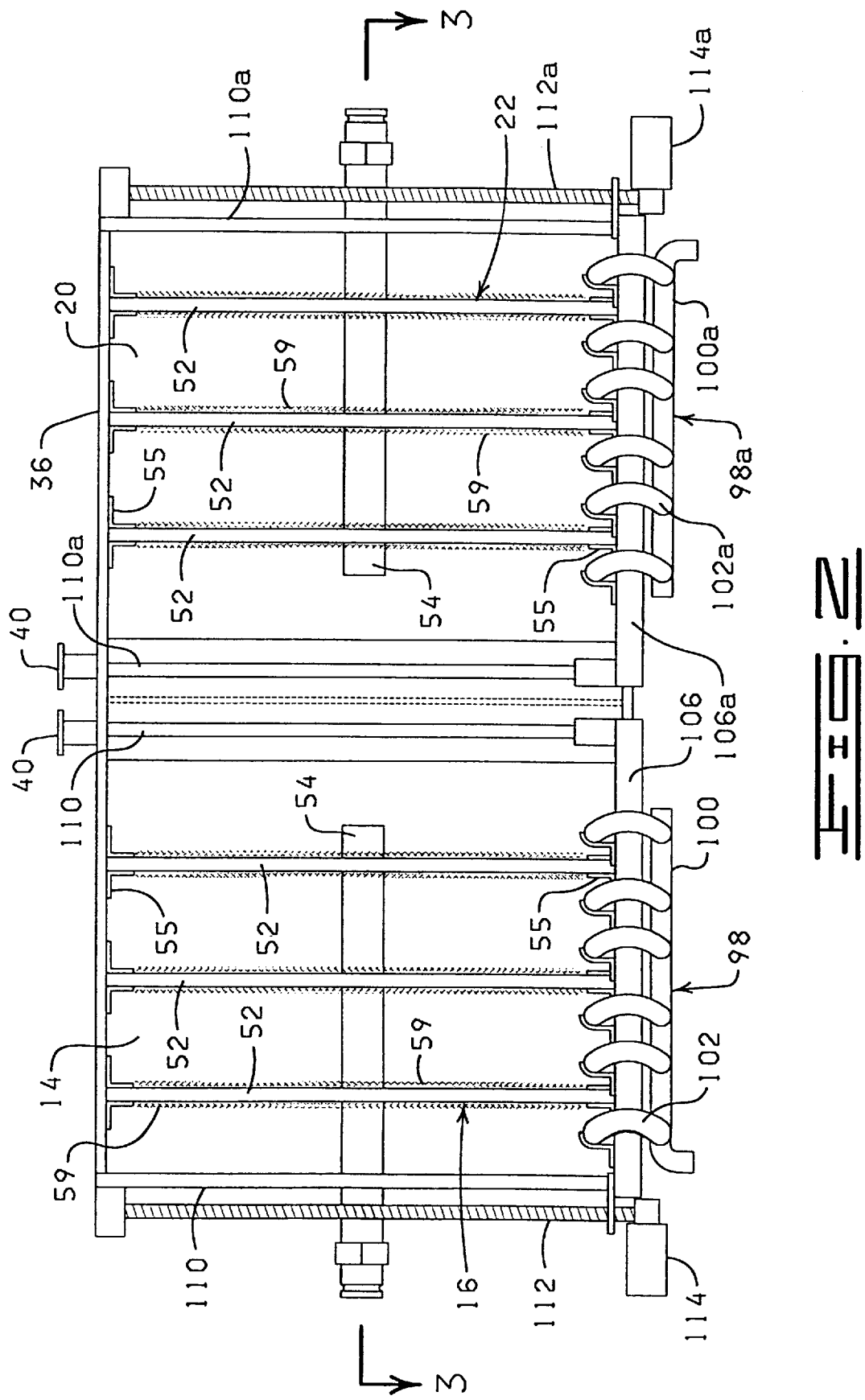
FIG. 2 is an enlarged, partially diagrammatic, plan view of a filter tank used in the filter system of the present invention.
Figure 3:
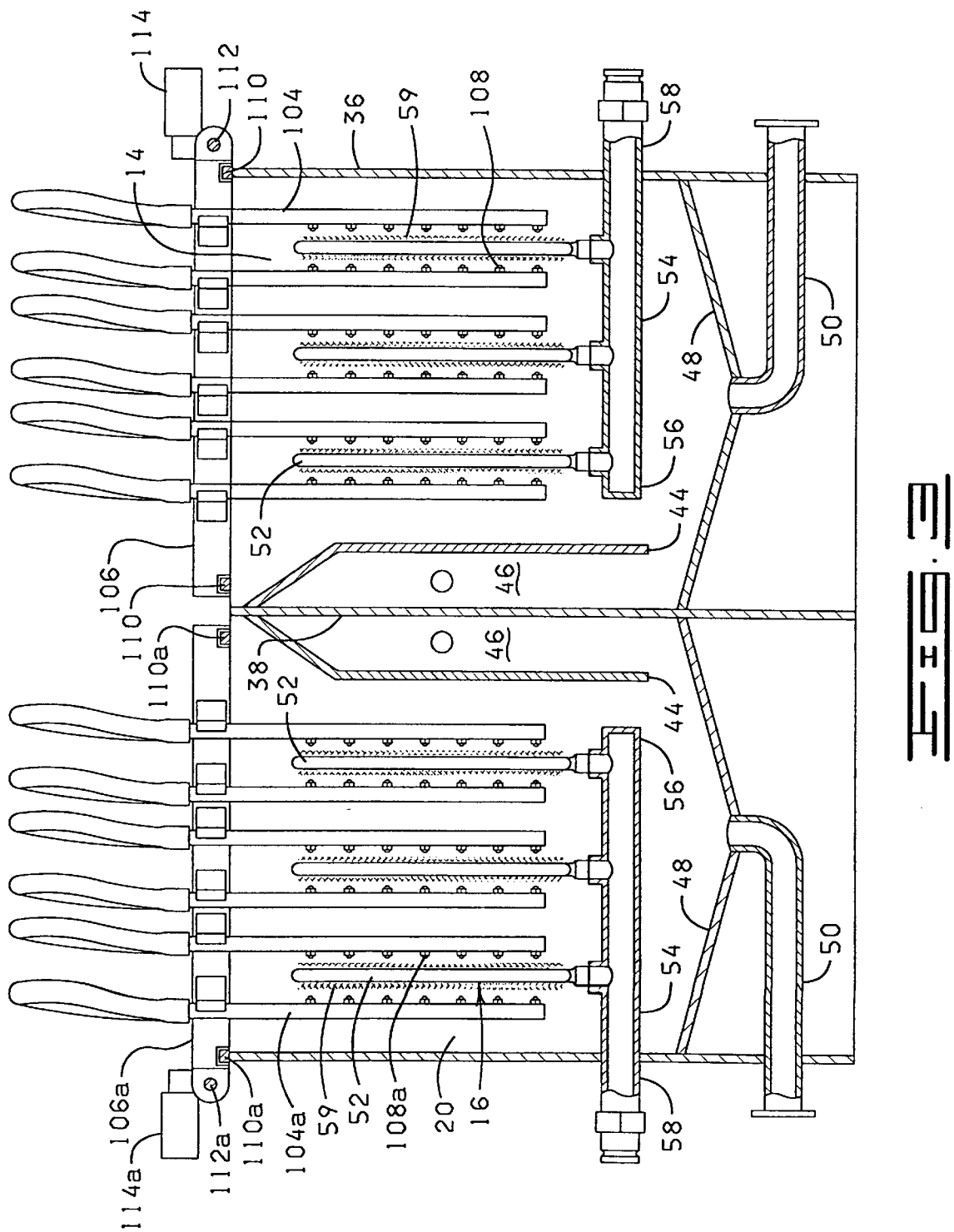
FIG. 3 is a cross-sectional view of the filter tank taken along line 3—3 in FIG. 2.

It will be appreciated that the filter chambers 14 and 20 can be constructed as individual units. However, it may be desirable to construct the filter chambers as a unitary member as best illustrated in FIGS. 2 and 3. In this instance, the filter system 10 includes a filter tank 36, which is constructed to define the first filter chamber 14 and the second filter chamber 20. The filter tank 36 is an open rectangular receptacle having a vertical dividing wall 38 (FIG. 3). Each of the filter chambers 14 and 20 includes an inlet port 40 (FIG. 2). Each filter chamber 14 and 20 is further provided with a baffle 44 (FIG. 3) adjacent the dividing wall 38 so as to define an inlet chamber 46, in which the inlet port 40 is provided to reduce turbulence in the filter chamber 14 or 20 as wastewater is being introduced into the filter chamber 14 or 20 through the inlet port 40. To facilitate solid waste removal, the filter chambers 14 and 20 each have a funnel-shaped bottom 48 (FIG. 3) with a waste discharge conduit 50 extending therefrom.

The filter assemblies 16 and 22 each include a plurality of filter elements 52 and a manifold 54. The filter elements 52 are depicted herein to be conventional leaf filters and thus include a pair of filter screens, which define a fluid flow channel, and an outlet in fluid communication with the fluid flow channel. The filter elements 52 are vertically supported in the filter chambers 14 and 20 in a spaced apart parallel relationship by a pair of brackets 55 and the outlet of each filter element 52 is connected to a portion of the manifold 54. Each manifold 54 has a closed first end 56 and a open second end 58. The open second end 58 of the manifold 54 extends from the respective filter chamber 14 or 20 and provides an outlet port for the filter chambers 14 and 20.

It will be appreciated that the filter elements 52 can contain any suitable woven metal or polymer filter cloth screening material. However, desirable results have been obtained wherein the screening material is a single Dutch weave mini-mesh woven material manufactured by Tylinter of Mentor, Ohio, having a mesh size of 50×250 or a mesh size of 24×110. It will further be appreciated that the number of filter elements 52 in the filter chambers 14 and 20 can vary and will be dependent upon the nature of the wastewater being treated. However, for the sake of simplicity, only three filter elements 52 are illustrated in each of the filter chambers 14 and 20.

Leaf filters as briefly described above are well known in the art. Thus, no further description of their components or construction is believed necessary in order for one skilled in the art to understand and implement the filter system 10 of the present invention.

To enhance filtration of wastewater by passage of wastewater through the filter assemblies 16 and 22, the filter elements 52 are typically precoated with a filter aid 59 (FIGS. 2 and 3). While any suitable filter aid can be used to coat the mesh filter elements 52 of the filter assemblies 16 and 22, desirable results have been obtained using diatomaceous earth filter aid which has an average micron size ranging from about 28 to about 77 microns. Such diatomaceous earth filter media are commercially available from Eagle-Picher Minerals, Inc. of Reno, Nev.

Referring again to FIG. 1, the filter system 10 includes a diatomaceous earth precoat delivery assembly 60 for selectively providing an aqueous slurry of diatomaceous earth filter aid to the filter chambers 14 and 20 for deposition on the filter elements 52 so as to enhance efficient removal of particulate contaminants from wastewater. The diatomaceous earth precoat delivery assembly 60 comprises a precoat tank 62. The precoat tank 62 is connected to the conduit 26 downstream of the valve 32 via a conduit 64 and is connected to the conduit 28 downstream of the valve 34 via the conduit 64 and a conduit 66. The precoat tank 62 is additionally connected to a clean water supply 68 for producing the aqueous slurry of diatomaceous earth filter aid. Conduit 64 is provided with a pump 70 for introducing the slurry into the filter chambers 14 and 20, and the conduits 64 and 66 are provided with valves 72 and 74, respectively, for controlling the flow of slurry into the filter chambers 14 and 20.

For discharging liquid passed through the filter assemblies 16 and 22, a conduit 76 is connected to the open end 58 of the manifold 54 of the first filter chamber 14, and a conduit 78 is connected to the open end 58 of the manifold 54 of the second filter chamber 20. The conduits 76 and 78 intersect with a conduit 80, which is connected to the discharge tank 18. A vacuum or discharge pump 82 is interposed in the conduit 76, and a vacuum or discharge pump 84 is interposed in the conduit 78. In addition, a control valve 86 is interposed in the conduit 76, and a control valve 88 is interposed in the conduit 78.

It should be noted that the pumps 82 and 84 function to draw the wastewater through the filter assemblies 16 and 22 as opposed to using a pump positioned upstream of the filter assemblies 16 and 22 to force the wastewater through the filter assemblies 16 and 22. Use of pressure can result in the filter aid and the accumulated solids becoming packed in the filter screens and thus making the spent filter cake difficult to remove. In contrast, by drawing the wastewater through the filter assemblies 16 and 22, the filter aid and solids are not packed into the filter screens and removal of the spent filter cake is accomplished more easily and efficiently.

To permit liquid passed through the first filter assembly 16 to be recirculated back into the first filter chamber 14, one end of a conduit 90 is connected to the conduit 76 upstream of the control valve 86 and downstream of the pump 82 and the other end of the conduit 90 is connected to the first filter chamber 14, preferably to the inlet chamber 46 of the first filter chamber 14. A valve 92 is interposed in the conduit 90 for controlling and regulating the flow of liquid back into the first filter chamber 14. Likewise, to permit liquid passed through the second filter assembly 22 to be recirculated back into the second filter chamber 20, one end of a conduit 94 is connected to the conduit 78 upstream of the control valve 88 and downstream of the pump 84 and the other end of the conduit 94 is connected to the second filter chamber 20, preferably to the inlet chamber 46 of the second filter chamber 20. A valve 96 is interposed in the conduit 94 for controlling and regulating the flow of liquid back into the second filter chamber 20.

As mentioned above, solids collected on the filter elements 52 of the filter assemblies 16 and 22 must be cleaned regularly. This process is generally known as "backwashing". To backwash the filter elements 52, the filter system 10 further comprises a pair of backwash assemblies 98 and 98*a*. The backwash assemblies 98 and 98*a* are identical in construction. Thus, only the backwash assembly 98 will be described in detail with the understanding that corresponding components of the backwash assembly 98*a* are designated with like numerals followed by the letter "a".

Referring now to FIGS. 2 and 3, the backwash assembly 98 comprises a header 100 from which a plurality of flexible conduits 102 extend. Each flexible conduit 102 is in turn connected to a corresponding rigid conduit 104 (FIG. 3) which is mounted to a carriage 106 and extended downward into the filter chamber 14 so that the conduits 104 are disposed in close proximity to the filter elements 52 of the filter assembly 16. Each of the conduits 104 is provided with a plurality of nozzles 108 directed towards an adjacent filter element 52 such that upon discharge of water through the nozzles 108, the water is directed onto the filter elements 52 so as to backwash same and remove contaminated filter media therefrom.

The carriage 106 is mounted on a pair of parallel tracks 110 extending across the width of the first filter chamber 14. The carriage 106 is threadingly connected to a drive screw 112, which extends substantially the width of the first filter chamber 14. One end of the drive screw 112 is connected to a motor 114 for selectively rotating the drive screw 112 in a desired direction. Rotation of the drive screw 112 in one direction causes the carriage 106 to travel along the tracks 110 and move the conduits 104 along the face of the filter elements 52. Upon traveling across the width of the first filter chamber 14, the direction of rotation of the drive screw 112 is reversed and the carriage 106 is caused to travel back across the first filter chamber 106.

Returning to FIG. 1, each backwash assembly 98 and 98*a* is connected to a source of filtered water, such as the discharge tank 18 or to another source of substantially pure water, such as the fresh water supply 68. In the first instance, the header 100 is connected to the discharge tank 18 via a conduit 116 and a conduit 118, and the header 98*a* is connected to the discharge tank 18 via a conduit 120 and the conduit 118. A backwash pump 122 is interposed in the conduit 118, and each conduit 116 and 120 is provided with a valve 124 and a valve 126, respectively, for controlling the flow of fluid to the backwash assemblies 98 and 98*a*.

To remove contaminants collected by the filter assemblies 16 and 22 and backwashed therefrom, a discharge conduit 128 is connected to the waste discharge conduit 50 of the first filter chamber 14 and a discharge conduit 130 is connected to the waste discharge conduit 50 of the second filter chamber 20. The opposite end of each discharge conduit 128 and 130 is connected to a conduit 132 that is connected to a decant tank 134 for collection of contaminants and subsequent processing prior to discharge. A valve 136 is interposed in the conduit 128 for controlling the flow of contaminants from the first filter chamber 14 to the decant tank 134 and a valve 138 is interposed in the conduit 130 for controlling the flow of contaminants from the second filter chamber 20 to the decant tank 134. A pump 140 is interposed in the conduit for pumping the contaminants from the first and second filter chambers 14 and 20 and into the decant tank 134.

Control and Operation

The filter system 10 is designed to automatically switch the flow of wastewater between the first and second filter chambers 14 and 20 upon the filter elements 52 of the filter assemblies 16 and 22 reaching a predetermined spent condition and then ready each of the spent filter elements 52 for another filtering cycle. To this end, conventional control systems are utilized to synchronize the operation of the various components of the filter system 10 described herein.

Referring to FIG. 1, the filter system 10 includes a computerized controller 142 for outputting signals to the various valves, pumps, and motors described above at predetermined intervals so as to synchronize the operation of the various components of the filter system 10. It will be appreciated that the control valves described herein many be electrically operated, hydraulically powered, or pneumatically operated, and that control valves and controllers constructed to operate in the manner described herein are well known in the art. Thus, a detailed description of such components is not believed necessary to enable one skilled in the art to understand and implement the filter system 10 of the present invention. As such, the connections between the controller 142 and the various valves, pumps, and motors have been omitted and instead are represented by the dashed line 143 for the sake of clarity.

In operation, the first filter chamber 14 is initially filled to a predetermined level with filtered water from the discharge tank 18 or alternate source of water, such as fresh water supply 68. When water from the discharge tank 18 is used, a conduit 144 is connected between the discharge tank 18 and the conduit 64 upstream of the pump 70. The controller 142 outputs a signal to energize the pump 70 and to open the valve 72 thereby causing water to be introduced into the first filter chamber 14.

A level controller 146 is operably connected to the first filter chamber 14. Upon the first filter chamber 14 being filled to a predetermined level, the level controller 146 outputs a signal to the controller 142 which in turn outputs a signal to close a valve 148 interposed in the conduit 144 and to open a valve 150 interposed in the conduit 64 so as to cause the precoat slurry to be pumped from the precoat tank 62 into the first filter chamber 14. A level controller 152 positioned in the precoat tank 62 outputs a signal to the controller 142 upon the precoat slurry being pumped from the precoat tank 62. The controller 142 then outputs a signal to close the valve 150 and activate a pump 154 to refill the precoat tank 62 to a predetermined level with water. Additional filter aid may then be added manually or automatically to the precoat tank 62 for forming another precoat slurry.

With the precoat slurry disposed in the first filter chamber 14, the controller outputs a signal to activate the discharge pump 82 and to close the valve 86 so as to cause the precoat slurry in the first filter chamber 14 to be circulated through the first filter chamber 14 to coat the filter elements 52 of the filter assembly 16 with the filter aid. After the slurry has circulated through the first filter chamber 14 for a period of time, an operator inspects the coated filter elements 52 to determine that they are properly coated. The operator then inputs an acknowledgement signal into the controller 142 to acknowledge that the precoat is applied.

Upon the precoat acknowledgement, a level controller 156 in the feed tank 12 sends a signal to the controller 142 to introduce the wastewater from the feed tank 12 into the first filter chamber 14 if a predetermined level of liquid is contained in the feed tank 12. If there is not adequate liquid in the feed tank 12, the liquid in the first filter chamber 14 is re-circulated through the first filter chamber 14. When a predetermined level of wastewater is contained in the feed tank 12, the controller 142 outputs a signal to energize the feed pump 30, to close the valve 72, to open the valve 32, and to open the valve 86 so as to cause wastewater to be pumped into the first filter chamber 14, drawn through the filter assembly 16 so as to produce an effluent which is withdrawn from the first filter chamber 14, and passed into the discharge tank 18.

A level controller 158 is operably connected to the first and second filter chambers 14 and 20 via a conduit 160 and a conduit 162 so that fluid communication is established between the level controller 158 and the first and second filter chambers 14 and 20. A valve 164 is interposed in conduit 162 for controlling fluid communication between the first filter chamber 14 and the level controller 158, and a valve 166 is interposed in the conduit 160 for controlling fluid communication between the second filter chamber 20 and the level controller 158. When the controller 142 activates the feed pump 30 and opens valves 32 and 86, the controller 142 also opens the valve 164 so as to establish fluid communication between the first filter chamber 14 and the level controller 158.

During the filtering cycle of the first filter chamber 14, a portion of the effluent of discharged liquid is recirculated into the first filter chamber 14 via the conduit 90 for proper operation of the discharge pump 82. The level of liquid is maintained in the first filter chamber 14 by the level controller 158 outputting a signal to control the speed of the feed pump 30. As such, if the level of liquid in the first filter chamber 14 begins to drop, the level controller 158 will cause a signal to be outputted by the controller 142 to increase the speed of the feed pump 30 accordingly. Conversely, if the level of liquid in the first filter chamber 14 rises due to the build up of solids on the filter elements 52, for example, the level controller 158 will cause a signal to be outputted by the controller 142 to decrease the speed of the feed pump 30 accordingly.

During the filtering cycle of the first filter chamber 14, the second filter chamber 20 is filled to a predetermined level with filtered water from the discharge tank 18 or the fresh water supply 68 in a manner similar to that described above for filling the first filter chamber 14. That is, the controller 142 outputs a signal to energize the pump 70 and to open the valve 74 thereby causing water to be introduced into the second filter chamber 20.

A level controller 168 is operably connected to the second filter chamber 20 so that fluid communication is established between the level controller 168 and the second filter chamber 20. Upon the second filter chamber 20 being filled to a predetermined level, the level controller 168 causes the controller 142 to output a signal to close the valve 148 interposed in the conduit 144 and to open a valve 150 interposed in the conduit 64 so as to cause the precoat slurry to be pumped from the precoat tank 62 into the second filter chamber 20. The level controller 152 positioned in the precoat tank 62 outputs a signal to the controller 142 upon the precoat slurry being pumped from the precoat tank 62. The controller 142 then outputs a signal to close the valve 150 and to activate the pump 154 so as to refill the precoat tank 62 to a predetermined level with water after which additional filter aid can be added and mixed.

With the second filter chamber 20 filled with water and the precoat slurry, the controller 142 outputs a signal to activate the discharge pump 84 and to close the valve 88 so as to cause the water and precoat slurry in the second filter chamber 20 to be circulated through the second filter chamber 20 to coat the filter elements 52 of the filter assembly 22 with the precoat. After a period of time, an operator inspects the coated filter elements 52 of the second filter assembly 22 to determine that they are properly coated. The operator then inputs an acknowledgement signal into the controller 142 to acknowledge that the precoat is applied.

The filtering process through the first filter chamber 14 is continued until the filter assembly 16 reaches a predetermined spent condition. To measure when the filter assembly 16 reaches the spent condition, a flow meter 170 and a turbidity meter 172 are interposed in the conduit 80 and a vacuum pressure switch 174 is interposed in the conduit 82 upstream of the discharge pump 82. The spent condition is indicated when the first of three conditions is met: (1) flow rate as measured by the flow meter 170 drops to a preset rate; (2) clarity as measured by the turbidity meter 172 decreases to a preset level; or (3) vacuum pressure downstream of the filter assembly 16 as measured by the vacuum pressure switch 174 increases to a preset level.

When one of the three preset conditions is reached and an operator has acknowledged that the second filter assembly 22 contains the appropriate precoating, the controller 142 outputs a signal to the valve 32 to close and a signal to the valve 34 to open thereby diverting the flow of wastewater from the first filter chamber 14 and into the second filter chamber 20. The controller additionally de-energizes the discharge pump 82 and simultaneously outputs a signal to open the valve 136 and to activate the decant pump 140 so as to cause the first filter chamber 14 to be drained.

When the liquid level in first filter chamber 14 reaches a predetermined low level as measured by the level controller 146, the controller 142 outputs a signal to initiate the backwashing process of the first filter assembly 16. To initiate the backwashing process, the controller 142 outputs a signal to open the valve 124 and to energize the backwash pump 122 and the motor 114 whereupon liquid is drawn from the discharge tank 18 and forced out through the nozzles 108 of the backwash assembly 98 against the filter cake formed on the filter elements 52. The motor 114 drives the drive screw 112 so as to cause the carriage 106 to travel along the tracks 110 and move the nozzles 108 along the face of the adjacent filter elements 52 washing the filter cake from the filter elements 52. Upon traveling across the first filter chamber 14, the carriage 106 trips a limit switch (not shown) that signals the controller 142 to reverse the direction of rotation of the drive screw 112 to cause the carriage 106 to travel back across the first filter chamber 14. The removed filter cake is pumped into the decant tank 134.

Upon acknowledgement by an operator that the backwash process is complete, the first filter chamber 14 is filled and precoated as described above. When the application of the precoat is acknowledged, the first filter chamber 14 is ready for another filtering cycle.

To initiate the filtering cycle in the second filter chamber 20, the controller 142 outputs a signal to close the valve 74, to open the valve 34, and to open the valve 88 so as to cause wastewater to be pumped into the second filter chamber 20, drawn through the filter assembly 22 so as to produce an effluent which is withdrawn from the second filter chamber 20, and passed into the discharge tank 18. The controller 142 additionally outputs a signal to open the valve 166 and to close the valve 164 so as to establish fluid communication between the second filter chamber 20 and the level controller 158.

During the filtering cycle of the second filter chamber 20, a portion of the discharged liquid is recirculated back into the second filter chamber 20 via the conduit 94 for proper operation of the discharge pump 84. The level of liquid is maintained in the second filter chamber 20 by the level controller 158 outputting a signal to control the speed of the feed pump 30. As such, if the level of liquid in the second filter chamber 20 begins to drop, the level controller 158 will cause a signal to be outputted by the controller 142 to increase the speed of the feed pump 30 accordingly. Conversely, if the level of liquid in the second filter chamber 20 rises due to solids build up on the filter elements 52 of the filter assembly 22, the level controller 158 will cause a signal to be outputted by the controller 142 to decrease the speed of the feed pump 30 accordingly.

The filtering process through the second filter chamber 20 is continued until the filter assembly 22 reaches a predetermined spent condition. As with the first filter assembly 16, the spent condition of the second filter assembly 22 is indicated when the first of three conditions is met: (1) flow rate as measured by the flow meter 170 drops to a preset rate; (2) clarity as measured by the turbidity meter 172 decreases to a preset level; or (3) vacuum pressure downstream of the filter assembly as measured by a vacuum pressure switch 175 interposed in the conduit 78 increases to a preset level.

When one of the three preset conditions is reached and an operator has acknowledged that the first filter assembly 16 contains the appropriate precoating, the controller 142 outputs a signal to the valve 34 to close and a signal to the valve 32 to open thereby diverting the flow of wastewater from the second filter chamber 20 and into the first filter chamber 14. The controller 142 additionally de-energizes the discharge pump 84 and simultaneously outputs a signal to open the valve 138 and to activate the decant pump 140 so as to cause the second filter chamber 20 to be drained.

When the liquid level in second filter chamber 20 reaches a predetermined low level as measured by the level controller 168, the controller 142 outputs a signal to initiate the backwashing process of the second filter assembly 22. To initiate the backwashing process, the controller 142 outputs a signal to open the valve 126 and to energize the backwash pump 122 and the motor 114a whereupon liquid is drawn from the discharge tank 18 and forced out through the nozzles 108a of the backwash assembly 98a against the filter cake formed on the filter elements 52 of the filter assembly 22. The motor 114a drives the drive screw 112a so as to cause the carriage 106a to travel along the tracks 110a and move the nozzles 108a along the face of the adjacent filter elements 52 washing the filter cake from the filter elements 52. Upon traveling across the second filter chamber 20, the carriage 106a trips a limit switch (not shown) that signals the controller 142 to reverse the direction of rotation of the drive screw 112a to cause the carriage 106a to travel back across the second filter chamber 20. The removed filter cake is passed into the decant tank 134.

Upon acknowledgement by an operator that the backwash process is complete, the second filter chamber 20 is filled and precoated as described above. When the application of the precoat is acknowledged, the second filter chamber 20 is ready for another filtering cycle. It will be appreciated that the controller 142 can be set up to switch the flow of wastewater back to the first filter chamber 14 upon the second filter assembly 22 in the second filter chamber 20 becoming spent and meeting one of the above conditions or the controller 142 can be set up to switch the flow of wastewater back to the first filter chamber 14 upon acknowledgment that the precoat has been applied to the first filter assembly 16.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed is:

1. A filter system for continuously removing solid matter from a wastewater, comprising:
   a first filter chamber having an inlet port and an outlet port;
   a first filter assembly operably positioned in the first filter chamber between the inlet port and the outlet port;
   a second filter chamber having an inlet port and an outlet port, the second filter chamber being constructed as a unitary member with the first filter chamber;
   a second filter assembly operably positioned in the second chamber between the inlet port and the outlet port;
   means for selectively introducing the wastewater into one of the first and second chambers via their respective inlet ports;
   means for passing the wastewater through the first filter assembly to separate solid matter from the wastewater so as to produce a first effluent and for discharging the first effluent from the first chamber via the outlet port thereof when the wastewater is being introduced into the first chamber; and
   means for passing the wastewater through the second filter assembly to separate solid matter from the wastewater so as to produce a second effluent and for discharging the second effluent from the second chamber via the outlet port thereof when the wastewater is being introduced into the second chamber.

2. The filter apparatus of claim 1 wherein each of the first and second filter assemblies comprises at least one filter element having a diatomaceous earth filter media disposed thereon, and wherein the means for passing the wastewater through the first filter chamber is a pump positioned downstream of the outlet port of the first filter chamber so as to draw the wastewater through the filter element of the first filter assembly and the means for passing the wastewater through the second filter chamber is a pump positioned downstream of the outlet port of the second filter chamber so as to draw the wastewater through the filter element of the second filter assembly.

3. The filter system of claim 2 further comprising:
   diatomaceous earth precoat delivery means for selectively providing an aqueous diatomaceous slurry to coat the filter elements of the first and second filter assemblies with diatomaceous earth filter media.

4. The filter apparatus of claim 2 wherein the means for introducing the wastewater into one of the first and second filter chambers diverts the flow of wastewater between the first filter chamber and the second filter chamber in response to the filter assembly into which the wastewater is being introduced reaching a predetermined spent condition.

5. The filter system of claim 4 further comprising:

means for measuring the flow rate of the effluent being discharged from the outlet port of the first filter chamber and the flow rate of the effluent being discharged from the outlet port of the second filter chamber;

means for measuring the clarity of the effluent being discharged from the outlet port of the first filter chamber and the clarity of the effluent being discharged from the outlet port of the second filter chamber; and means for measuring the vacuum pressure downstream of the first filter assembly and the vacuum pressure downstream of the second filter assembly, wherein the spent condition of the filter assembly into which the wastewater is being introduced is determined when one of the flow rate of the effluent from the filter chamber, the clarity of the effluent from the filter chamber, and the vacuum pressure downstream of the filter assembly reaches a preset level.

6. The filter system of claim 4 further comprising:

means for independently backwashing the first filter assembly and the second filter assembly upon the first and second filter assemblies reaching their spent condition.

7. A filter apparatus for continuously removing solid matter from a wastewater, comprising:

a first filter chamber having an inlet port and an outlet port;

a first filter assembly disposed in the first filter chamber, the first filter assembly, comprising:

a filter element having a pair of filter screens defining a fluid flow channel and an outlet in fluid communication with the fluid flow channel; and a manifold having one end connected to the outlet port of the first filter chamber and a portion connected to the outlet of the filter element such that fluid communication is established between the fluid flow channel of the filter element and the outlet port of the first filter chamber;

a second filter chamber having an inlet port and an outlet port, the second filter chamber constructed as a unitary unit with the first filter chamber;

a second filter assembly disposed in the second filter chamber, the second filter assembly, comprising:

a filter element having a pair of filter screens defining a fluid flow channel and an outlet in fluid communication with the fluid flow channel; and a manifold having one end connected to the outlet port of the second filter chamber and a portion connected to the outlet of the filter element such that fluid communication is established between the fluid flow channel of the filter element and the outlet port of the second chamber;

means for selectively introducing the wastewater into one of the first and second filter chambers via their respective inlet ports;

vacuum means for drawing the wastewater through the first filter assembly to separate solid matter from the wastewater so as to produce a first effluent and for withdrawing the first effluent from the first filter chamber via the outlet port thereof when the wastewater is being introduced into the first chamber; and vacuum means for drawing the wastewater through the second filter assembly to separate solid matter from the wastewater so as to produce a second effluent and for withdrawing the second effluent from the second chamber via the outlet port thereof when the wastewater is being introduced into the second chamber.

8. The filter system of claim 7 further comprising:

diatomaceous earth precoat delivery means for selectively providing an aqueous diatomaceous slurry to coat the filter elements of the first and second filter assemblies with the diatomaceous earth filter media.

9. The filter system of claim 7 wherein the means for introducing the wastewater into one of the first and second filter chambers diverts the flow of wastewater between the first filter chamber and the second filter chamber in response to the filter assembly into which the wastewater is being introduced reaching a predetermined spent condition.

10. The filter system of claim 9 further comprising:

means for measuring the flow rate of the effluent being withdrawn from the outlet port of the first filter chamber and the flow rate of the effluent being withdrawn from the outlet port of the second filter chamber;

means for measuring the clarity of the effluent being withdrawn from the outlet port of the first filter chamber and the clarity of the effluent being withdrawn from the outlet port of the second filter chamber; and means for measuring the vacuum pressure downstream of the first filter assembly and the vacuum pressure downstream of the second filter assembly, wherein the spent condition of the filter assembly into which the wastewater is being introduced is determined when one of the flow rate of the effluent from the filter chamber, the clarity of the effluent from the filter chamber, and the vacuum pressure downstream of the filter assembly reaches a preset level.

11. The filter system of claim 9 further comprising:

means for independently backwashing the first filter assembly and the second filter assembly upon the first and second filter assemblies reaching their spent condition.

* * * * *